United States Patent [19]

Thill

[11] 3,758,629
[45] Sept. 11, 1973

[54] CROSS-LINKING OF ADDITION POLYMERS CONTAINING COMBINED FREE CARBOXYL BY REACTION WITH A DI-2-OXAZOLINE

[75] Inventor: Bruce P. Thill, Midland, Mich.

[73] Assignee: The Dow Chemical Company, Midland, Mich.

[22] Filed: May 7, 1971

[21] Appl. No.: 141,415

[52] U.S. Cl. ...... 260/80.8, 260/78.5 T, 260/79.5 C, 260/79.5 PR, 260/80 P, 260/80.3 N, 260/80.3 R, 260/82.1, 260/85.5 S, 260/85.7, 260/86.1 R, 260/87.5 R, 160/87.7, 260/88.1 PC, 117/124 E

[51] Int. Cl. ............................................. C08f 27/08

[58] Field of Search ...................... 260/80.8, 78.5 T, 260/79.5 PR, 79.5 C, 80 P, 80.3 R

[56] References Cited
UNITED STATES PATENTS

| | | | |
|---|---|---|---|
| 2,547,497 | 4/1951 | Rowland | 260/101 |
| 2,794,742 | 6/1957 | Fowler et al. | 96/87 |
| 2,931,742 | 4/1960 | Hicks | 117/161 |
| 3,192,224 | 6/1965 | Kapar | 260/307 |
| 3,342,896 | 9/1967 | Zimmerman et al. | 260/837 |
| 3,419,520 | 12/1968 | Campbell et al. | 260/41.5 |
| 3,535,291 | 10/1970 | Riemhofer et al. | 260/78.5 |
| 3,609,161 | 9/1971 | Dowbenko | 260/307 |

FOREIGN PATENTS OR APPLICATIONS 752,046  12/1970  Belgium

OTHER PUBLICATIONS

Fry, J. Org. Chem., 15, 802 (1952)

Kagiya et al., J. Polymer Sci., Pt. B., 4 (1966)

Primary Examiner—Joseph L. Schofer
Assistant Examiner—Stanford M. Levin
Attorney—Griswold & Burdick, Ronald G. Brookens and Albin R. Lindstrom

[57] ABSTRACT

Cross-linking of addition polymers containing free carboxyl groups by utilizing, as a cross-linking agent, from 0.1 to 10 equivalents per equivalent of free carboxyl of a di-2-oxazoline of the formula

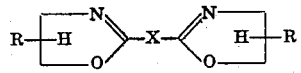

wherein X represents

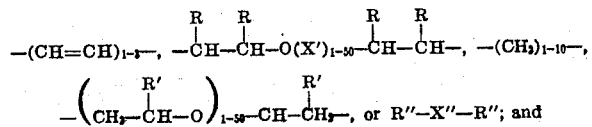

in the above formulae each R represents hydrogen or alkyl having from one to four carbon atoms; X' represents ethyleneoxy or propyleneoxy; R' represents hydrogen or alkyl having from one to three carbon atoms; X'' represents oxygen or sulfur; and R'' represents alkylene of from two to 20 carbon atoms, arylene of from six to 10 carbon atoms or arylakylene of from seven to 15 carbon atoms.

4 Claims, No Drawings

CROSS-LINKING OF ADDITION POLYMERS CONTAINING COMBINED FREE CARBOXYL BY REACTION WITH A DI-2-OXAZOLINE

BACKGROUND OF THE INVENTION

Bis-2-oxazolines are known in the literature as monomers in the preparation of polymeric imidoesters, e.g. as disclosed in U.S. Pat. No. 2,547,497, issued Apr. 3, 1951; as epoxy cross-linking agents, e.g., as disclosed in U.S. Pat. No. 3,192,224, issued June 29, 1965; and as vulcanization enhancers, e.g. as disclosed in U.S. Pat. No. 3,419,520, issued Dec. 31, 1968. Further, the ring opening reaction of 2-substituted-2-oxazolines by carboxylic acids is known, e.g. as disclosed by E. M. Fry, J. Org. Chem., 15, 802 (1950), and has been applied to the coreaction of a dicarboxylic acid with a bis-oxazoline to produce linear polyamide esters, e.g. as disclosed by Kagiya et al, J. Polymer Sci., Pt. B. 4, 257 (1966).

SUMMARY

It has now been discovered, which discovery represents the present invention, that utilization of certain di-2-oxazoline compounds as cross-linking agents for addition polymers containing combined free carboxyl (—COOH), provides cross-linked polymers of excellent solvent resistance and unexpectedly good flexibility while eliminating the necessity for the use of catalysts and precludes the production of undesirable volatile by products in and during the cross-linking reaction.

More specifically, the present invention is directed to cross-linked addition polymers formed from the reaction of (1) an addition polymer containing combined free carboxyl (—COOH) and (2) from 0.1 to 10 equivalents per equivalent of said free carboxyl of a di-2-oxazoline of the formula

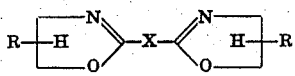

wherein X represents

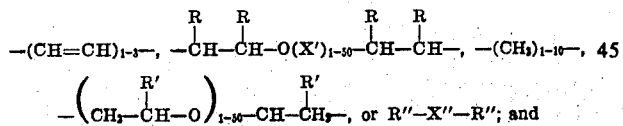

in the above formulae each R represents hydrogen or alkyl having from one to four carbon atoms; X' represents ethyleneoxy or propyleneoxy; R' represents hydrogen or alkyl having from one to three carbon atoms; X'' represents oxygen or sulfur; and R'' represents alkylene of from two to 20 carbon atoms, arylene of from six to 10 carbon atoms, or arylalkylene of from seven to 15 carbon atoms.

DESCRIPTION OF THE PREFERRED EMBODIMENTS

The addition polymers utilized in the present invention contain combined free carboxyl (—COOH) preferably in an amount of from 1 to 20 percent by weight of the polymer.

Exemplary of such polymers are those materials prepared from polymerizable monomeric ethylenically unsaturated compounds including the $C_1$–$C_{18}$ primary and secondary alkyl esters of acrylic acid, such as methyl acrylate, ethyl acrylate, propyl- and isopropyl acrylates, butyl-, isobutyl- and sec.-butyl acrylates, amyl- and isoamyl acrylates, hexyl acrylate, 2-ethylhexyl acrylate, lauryl acrylate, octyl acrylate, 3,5,5-trimethylhexyl acrylate, decyl acrylate, dodecyl acrylate, cetyl acrylate, octadecyl acrylate, octadecenyl acrylate and the like; and $C_1$–$C_{18}$ primary and secondary alkyl esters of methacrylic acid, such as methyl-, ethyl-, propyl-, isopropyl-, butyl-, isobutyl-, and sec.-butyl methacrylates, n-amyl methacrylate, sec.-amyl methacrylate, hexyl methacrylate, 2-ethylbutyl methacrylate, 2-ethylhexyl methacrylate, lauryl methacrylate, octyl methacrylate, 3,5,5-trimethylhexyl methacrylate, decyl methacrylate, dodecyl methacrylate, octadecyl methacrylate and the like.

Also contemplated as useful comonomers may be acrylonitrile and methacrylonitrile; as well as acrylamide, methacrylamide, ethacrylamide, ethylenebisacrylamide, N-tert.-butylacrylamide and the like.

Various monoalkenyl aromatic hydrocarbons of the benzene series may be suitable comonomers for the presently intended purpose and such monomers are characterized by the general formula:

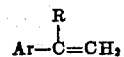

wherein Ar, selected independently, represents an aromatic hydrocarbon and a nuclear halohydrocarbon radical and R is hydrogen, a $C_1$–$C_4$ alkyl radical, or a halogen radical having an atomic number of from 17 to 35, including styrene, α-methylstyrene, o-methylstyrene, p-methylstyrene, m-methylstyrene, ar-ethylstyrene, propylstyrenes, butyl-styrenes, ar-chlorostyrene, ar-bromostyrene and the like. Other monomeric ethylenically unsaturated compounds contemplated as comonomers for present purposes can be open-chain aliphatic conjugated dienes having from four to nine carbon atoms, such as butadiene, isoprene and the like; as well as vinyl ester monomers including vinyl acetate, vinyl propionate, vinyl butyrate and the like; and vinylidene chloride.

The free unsaturated carboxylic acids capable of being copolymerized in the formation of the described addition polymers may be monocarboxylic or polycarboxylic acids, such as maleic acid, fumaric acid, itaconic acid or crotonic acid. It is of particular advantage to use simple unsaturated monocarboxylic acids having a methylene group bound to the alpha carbon atom of the general formula

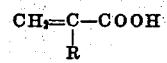

in which R represents hydrogen, halogen or a lower alkyl radical, for example, methacrylic acid, alpha chloroacrylic acid and especially acrylic acid.

The di-2-oxazolines used in the present invention are known, e.g., as disclosed in Belgium Pat. No. 752,046, issued Dec. 16, 1970 and may be prepared by the procedures disclosed therein. In general, such compounds are prepared by any of a group of synthetic routes all of which pass, advantageously, through a cyano group; in the sense that, at each molecular site where an oxazoline heterocycle is desired, there is provided as a precursor site, a cyano. From such site it is, in general, convenient and easy to go on to the desired heterocycle. The only condition believed to be limiting is that, with respect to the reactions that go on from the cyano to the heterocycle, preferably the cyano be the most reactive or only significantly reactive site; or, if any other site on the starting cyano compound be more reactive than cyano, then known alternative procedures must be considered.

Exemplary of such di-2-oxazolines are 2,2'-oxydiethylenebis-2-oxazoline; 2,2'-thiodiethylenebis-2-oxazoline; 2,2'-oxybis(p-phenylenemethylene)bis-2-oxazoline; 2,2'-oxydi-p-phenylenebis-2-oxazoline; 2,2'-propylenebis(oxyethylene)bis-2-oxazoline; 2,2'-ethylene-bis(oxyethylene)bis-2-oxazoline; 2,2'-vinylenebis-2-oxazoline; 2,2'-vinylenebis(methyl-2-oxazoline); 2,2'-(1,3-butadienylene)bis-2-oxazoline and 2,2'-tetramethyl-enebis-2-oxazoline.

The described di-2-oxazolines are employed in amounts of from 0.1 to 10 equivalents per equivalent of free carboxyl present in the described addition polymers, which polymers preferably contain from 1 to about 20 percent of free carboxyl based on polymer weight. In this regard, if greater than about 10 equivalents of di-2-oxazoline are used, the resulting polymeric reaction product may become undesirably discolored and the di-2-oxazoline may exude therefrom; on the other hand, if less than 1 equivalent of di-2-oxazoline is used, insufficient cross-linking occurs. Following addition of the prescribed amounts of di-2-oxazoline to the free carboxyl containing addition polymer, cross-linking is effected, in the absence of catalysts and undesirable reaction by-products, by merely heating the mixture to curing temperatures. Generally, temperatures between about 120° and 150°C are sufficient if maintained for a period of at least about 2 hours. Lower temperatures with corresponding longer periods of heating, can be utilized if desired.

The present invention is particularly useful for preparing cross-linked polymeric film materials having excellent chemical resistance and unexpectedly good flexibility, by a process comprising preparing a solution of the addition polymer in an inert solvent therefore, then dissolving the di-2-oxazoline therein and casting a film from the resultant solution. Thereafter, the solvent is removed, as by evaporation, and the polymeric residue is cured by heating. The following example is intended to illustrate the present invention but is not to be construed as limiting its scope.

EXAMPLE 1

A. Preparation of Free Carboxyl Containing Addition Polymer

To 270 g of a 1:1 benzene-ethylacetate solution containing 0.2 g of azobisisobutyronitrile (AIBN) at reflux under nitrogen was added, dropwise with stirring over 2.5 hours, a nitrogen-purged solution of 30 g of of methacrylic acid, 165 g of methyl methacrylate and 105 g of butyl acrylate together with 2.0 g of AIBN. One hour after completion of the addition an additional 0.4 g of AIBN in 15 g of benzene-ethylacetate was added and such addition repeated 2 hours after the addition was complete. The reaction mixture was held at reflux for a total of 8 hours. Calculated percent solids is 50.2 percent and actual percent solids was 51.06 percent. Molecular weight by osmometry ($M_n$) was found to be 27,000.

B. Addition of bis-oxazoline and film formation

Series 1: 2,2'-Thiodiethylenebis-2-oxazoline

A sample of the above addition copolymer was diluted to 10 percent solids with a 1:1 ratio of benzene and ethylacetate and 10 g samples each containing 0.00116 eg. of carboxyl group were combined with from 0.1–10 eq. of 2,2'-thiodiethylenebis-2-oxazoline based on free carboxyl groups in the polymer. The weight of bis-oxazoline added to each sample is listed in the following table;

TABLE I

| Sample | Wgt. added bis-oxazoline | Eq. added bis-oxazoline | No. of eq. bis-oxazoline based on free carboxyl |
|---|---|---|---|
| A | 1.32 g | 0.0058 | 10.0 |
| B | 0.66 | 0.0029 | 5.0 |
| C | 0.132 | 0.00058 | 1.0 |
| D | 0.066 | 0.00029 | 0.5 |
| E | 0.013 | 0.000058 | 0.1 |
| F | 0.00 | 0.0 | 0.0 |

Approximately 1 ml. of each solution was spread on silanized glass microscope slides and allowed to dry to a film overnight. The samples were then cured at 130°C for 2 hours, cooled to room temperature and the cured films stripped from the slides.

The relative extent of cross-linking was determined by soaking measured strips of polymer in acetone for 16 hours and measuring the length increase caused by solvent imbibition.

The results are shown in Table II.

TABLE II

Sixteen Hour Acetone Swelling Tests of Cross-linked Polymers Samples cured two hours at 130°C.

| Sample | Eq. oxazoline/ Eq. free carboxyl | % Length Increase | Comment |
|---|---|---|---|
| A | 10 | 109 | Waxy yellow appearance |
| B | 5 | 42 | Slightly yellow, clear |
| C | 1 | 54 | Clear colorless film |
| D | 0.5 | 76 | Do. |
| E | 0.1 | 124 | Do. |
| F | 0 | dissolved | Do. |

Films were prepared in an analogous manner from 20% solids solutions of the same polymer and cured for various times at 150°C. The results are listed in Table III.

TABLE III

Seventy-two Hour Acetone Swelling Tests of Cross-linked Polymers

| Sample | Eq. of oxazoline/ Eq. of free carboxyl | % length increasd after curing at 150°C. | | |
|---|---|---|---|---|
| | | 2 hrs. | 4 hrs. | 8 hrs. |
| G | 1.0 | 88 | 60 | 52 |
| H | 0.5 | 300 | 83 | 52 |
| I | 0.1 | dissolved | dissolved | 128 |

Series 2: 2,2'-Oxydiethylenebis-2-oxazoline

A 10 percent solution in benzene:ethylacetate (1:1 by weight) of the addition copolymer was combined with 1.0, 0.5 and 0.2 equivalents of 2,2'-oxydiethylenebis-2-oxazoline per carboxyl in the polymer. Films were case from these polymers, were cured at 150°C for 8 hours, and swelled in acetone for 72 hours. The results are summarized in Table IV.

TABLE V

Seventy-two Hour Acetone Swelling Test of 2,2'-Oxydiethylenebis-2-oxazoline Cross-linked Polymer

| Sample | Eq. of oxazoline/ Eq. of free carboxyl | % length increase |
|---|---|---|
| J | 1.0 | 32 |
| K | 0.5 | 44 |
| L | 0.2 | 88 |
| M | 0.0 | dissolved |

Series 3: Tetramethylenebis-2-oxazoline

In Table V are given the results of treating the addition polymer with tetramethylenebis-2-oxazoline in an exactly analogous fashion.

TABLE V

Seventy-two Hour Acetone Swelling Test of Tetramethylelebis-2-oxazoline Cross-linked Polymer

| Sample | Eq. of oxazoline/ Eq. of free carboxyl | % length increase |
|---|---|---|
| N | 1.0 | 52 |
| O | 0.5 | 52 |
| P | 0.2 | 88 |
| Q | 0.0 | dissolved |

The above data illustrate the desirability of use of the di-2-oxazolines described herein in combination with addition polymers containing combined free carboxyl, as cross-linkable coating systems. It was further noted that the coatings formed from such cross-linked materials were characterized by being tough and unusually and unexpectedly flexible, thus permitting the use of such materials for a wide range of applications.

What is claimed is:

1. A cross-linked addition polymer formed from the reaction of (1) an addition polymer containing combined free carboxyl (—COOH) and (2) from 0.1 to 10 equivalents per equivalent of said free carboxyl of a di-2-oxazoline of the formula

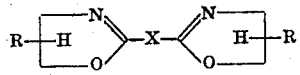

wherein X represents

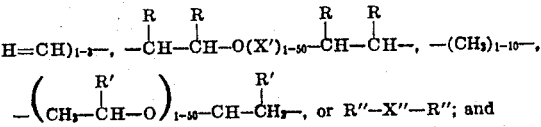

and in the above formulae each R represents hydrogen or alkyl having from one to four carbon atoms; X' represents ethyleneoxy or propyleneoxy; R' represents hydrogen or alkyl having from one to three carbon atoms; X" represents oxygen or sulfur; and R" represents alkylene of from two to 20 carbon atoms, arylene of from six to 10 carbon atoms, or arylalkylene of from seven to 15 carbon atoms.

2. The cross-linked addition polymer of claim 1 wherein said addition polymer contains from about 1 to 20 percent by weight of free carboxyl (–COOH).

3. The cross-linked addition polymer of claim 2 wherein said addition polymer is an interpolymer of methyl methacrylate, butyl acrylate and methacrylic acid.

4. The cross-linked addition polymer of Claim 3 wherein said di-2-oxazoline is selected from the group consisting of 2,2'-thiodiethylenebis-2-oxazoline, 2,2'-oxydiethylenebis-2-oxazoline and 2,2'-tetramethylenebis-2-oxazoline.

* * * * *